United States Patent
Ohde et al.

(10) Patent No.: US 6,839,174 B1
(45) Date of Patent: *Jan. 4, 2005

(54) RELIEF TYPE DIFFRACTION OPTICAL ELEMENT, OPTICAL SYSTEM COMPRISING THE SAME AND MOLD FOR MANUFACTURING THE SAME

(75) Inventors: Hisashi Ohde, Hachioji (JP); Yasuhiro Kamihara, Hino (JP)

(73) Assignee: Olympus Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,954

(22) Filed: Mar. 2, 1998

(30) Foreign Application Priority Data

Mar. 3, 1997 (JP) ............................................. 9-047782
Jun. 4, 1997 (JP) ............................................. 9-146086

(51) Int. Cl.[7] ............................................... G02B 5/18
(52) U.S. Cl. ........................ 359/574; 359/575; 359/569
(58) Field of Search .................................. 359/574, 569, 359/575, 571, 566, 565

(56) References Cited

U.S. PATENT DOCUMENTS

| 5,260,828 A | * | 11/1993 | Londono et al. | ............ 359/565 |
| 5,627,679 A | * | 5/1997 | Iba | .............. 359/565 |
| 5,682,266 A | * | 10/1997 | Meyers | ....................... 359/575 |
| 5,801,889 A | * | 9/1998 | Meyers et al. | ............... 359/520 |

* cited by examiner

Primary Examiner—Mark A. Robinson
Assistant Examiner—Alessandro Amari
(74) Attorney, Agent, or Firm—Stevens, Davis, Miller & Mosher, LLP

(57) ABSTRACT

A relief type diffraction optical element including a substrate made of an optical material, said substrate having formed on its surface a non-even width relief pattern which include a first zone group consisting of at least one zone whose cross sectional configuration is formed by a curvilinear portion which follows a phase shift function or at least two rectilinear portions which approximates the phase shift function, and a second zone group consisting of a plurality of zones each having a single rectilinear portion approximating the phase shift function.

21 Claims, 12 Drawing Sheets

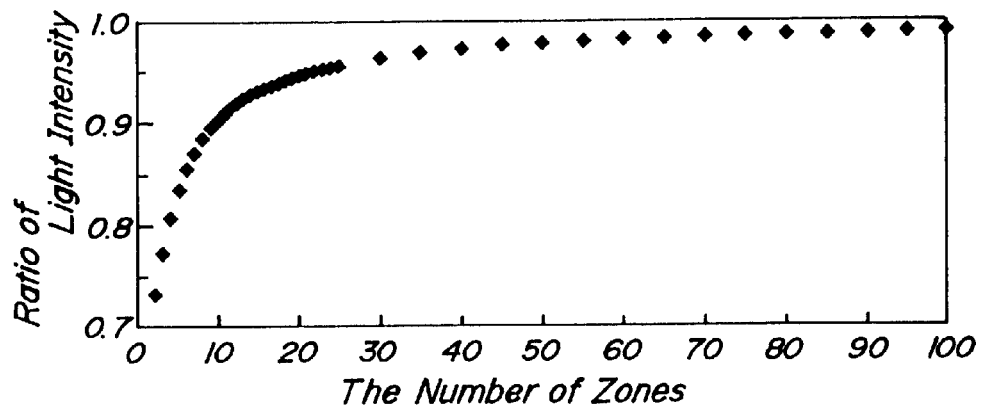
FIG_4
PRIOR ART
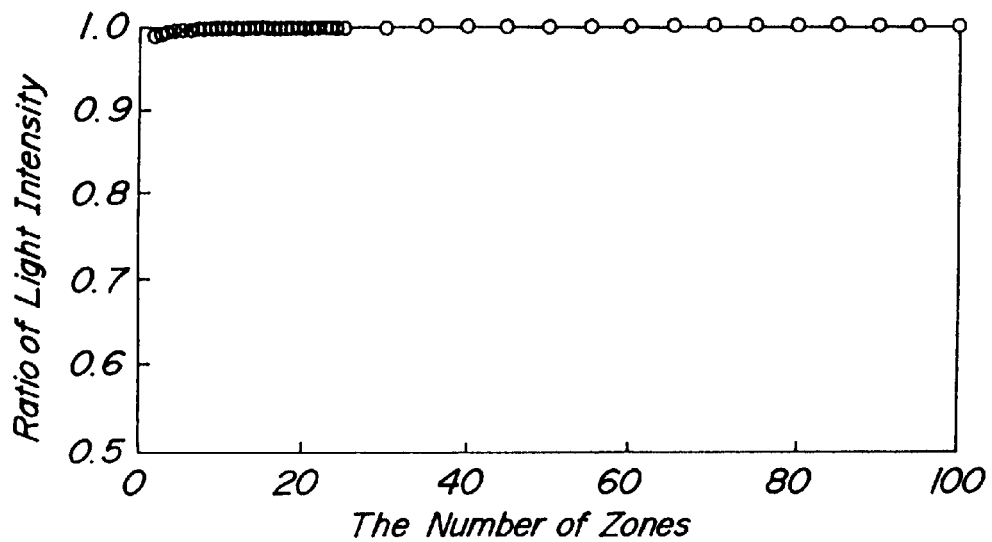
FIG_5
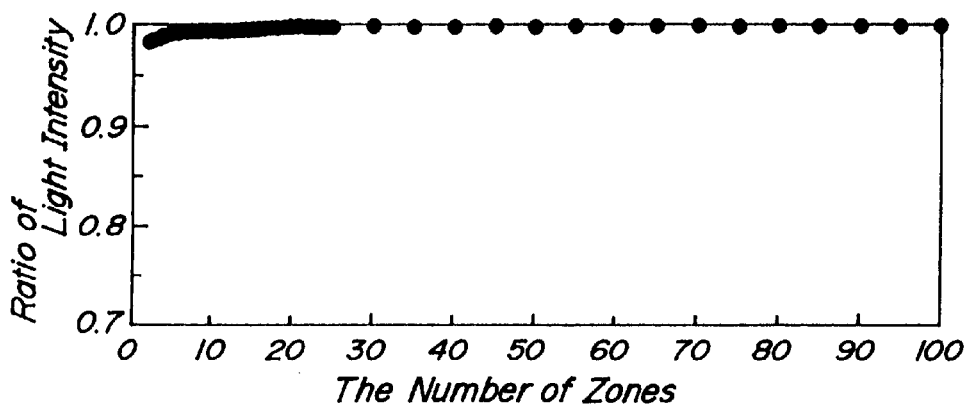
FIG_6

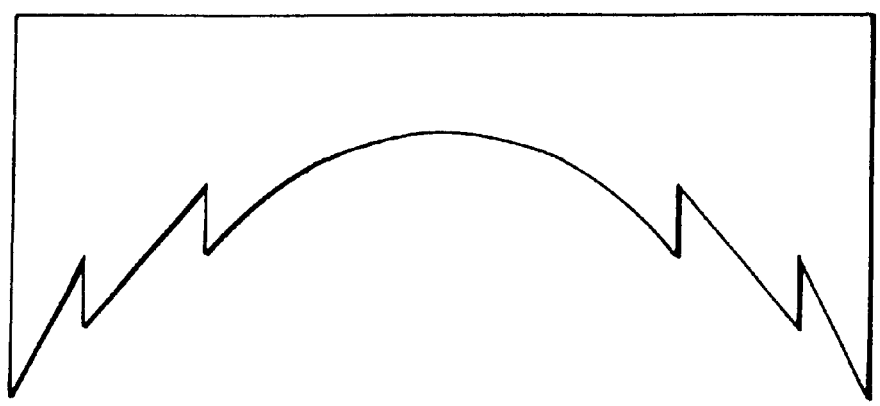
FIG_11
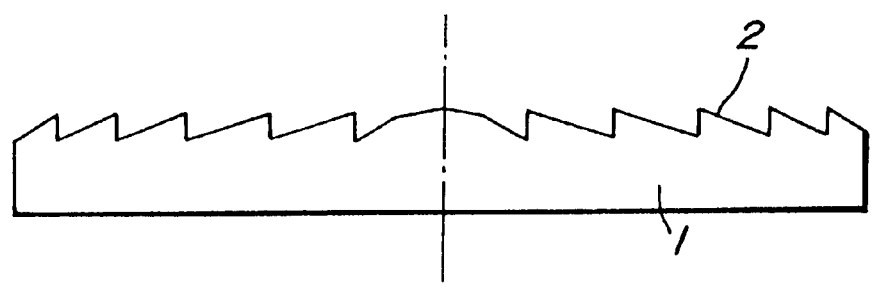
FIG_12
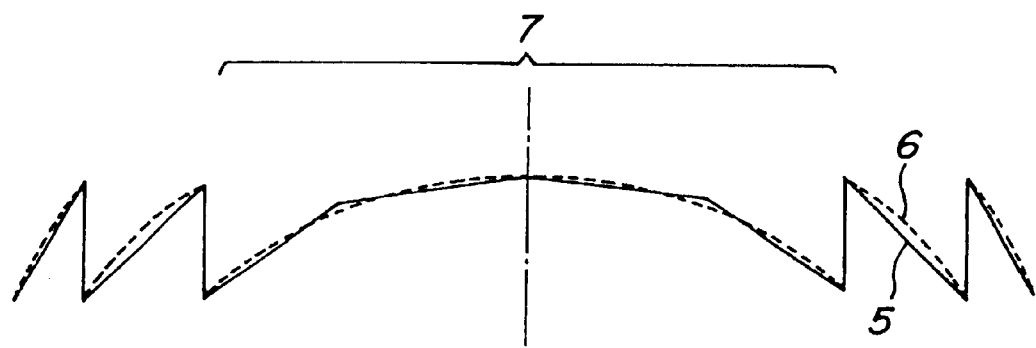
FIG_13

FIG_14
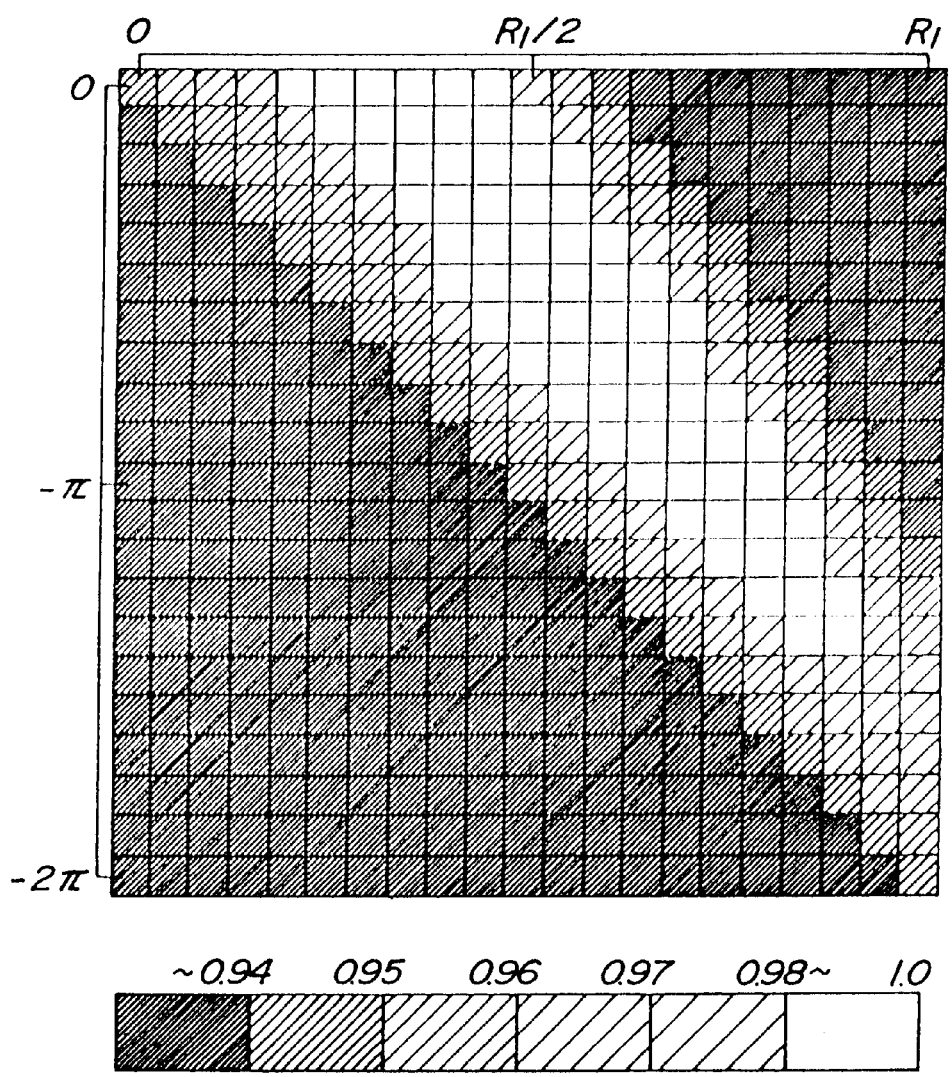

FIG._15
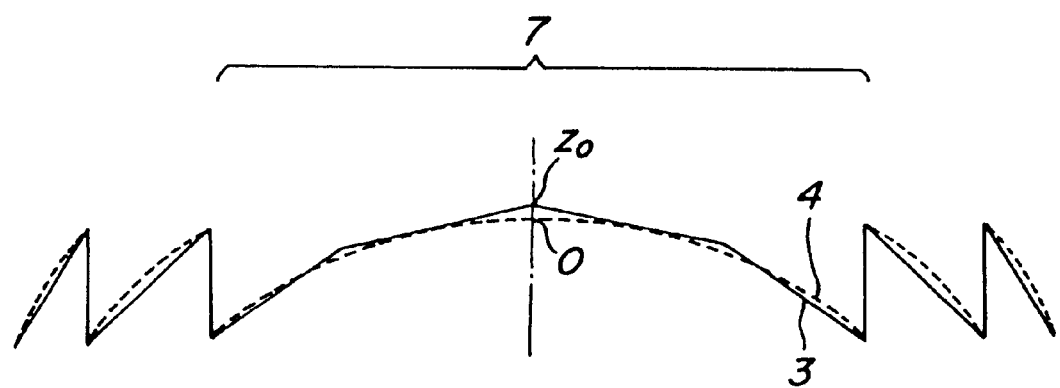
FIG._16
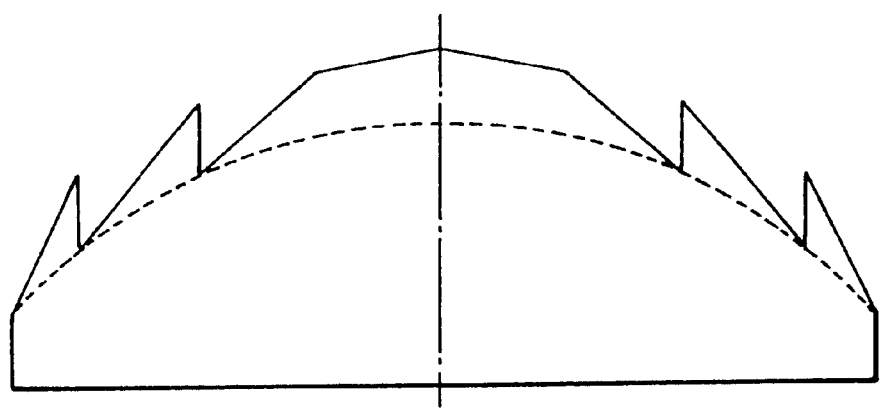

FIG_17
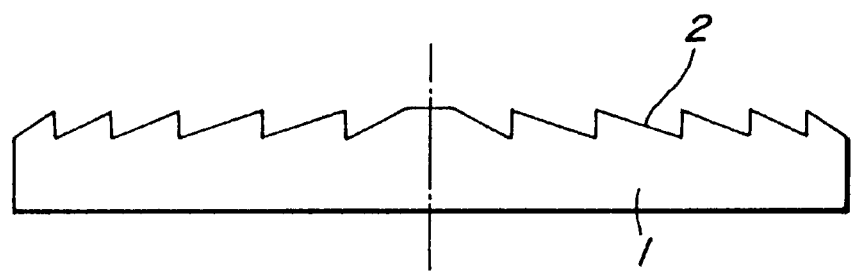
FIG_18
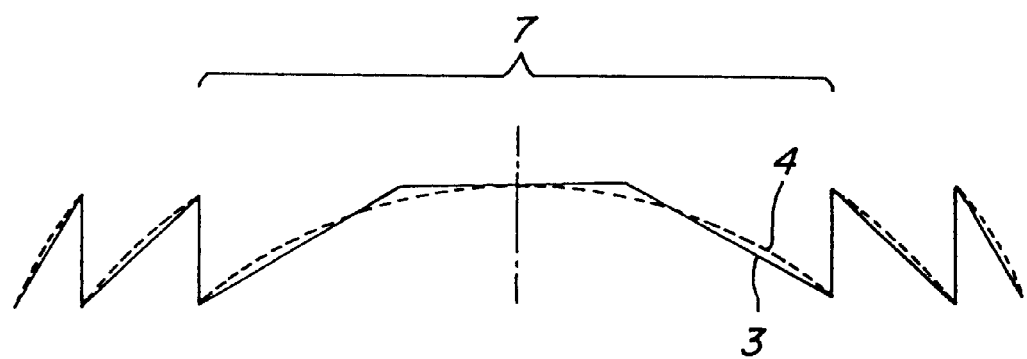

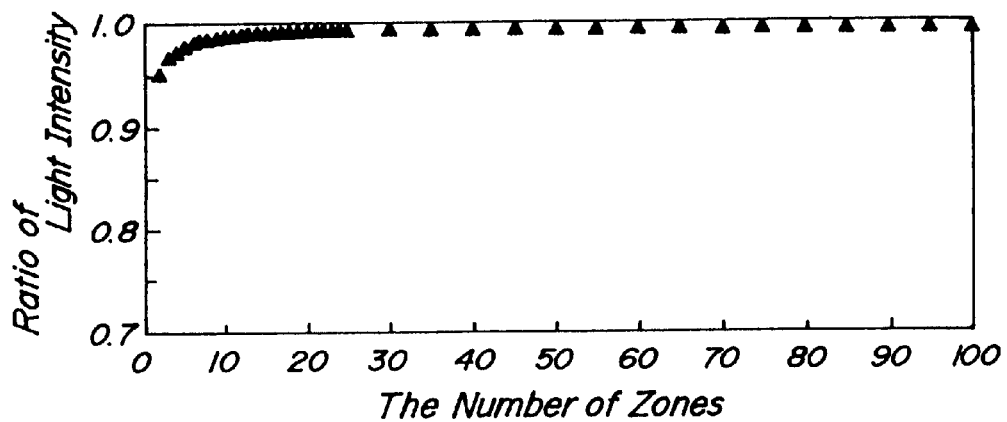
FIG_19
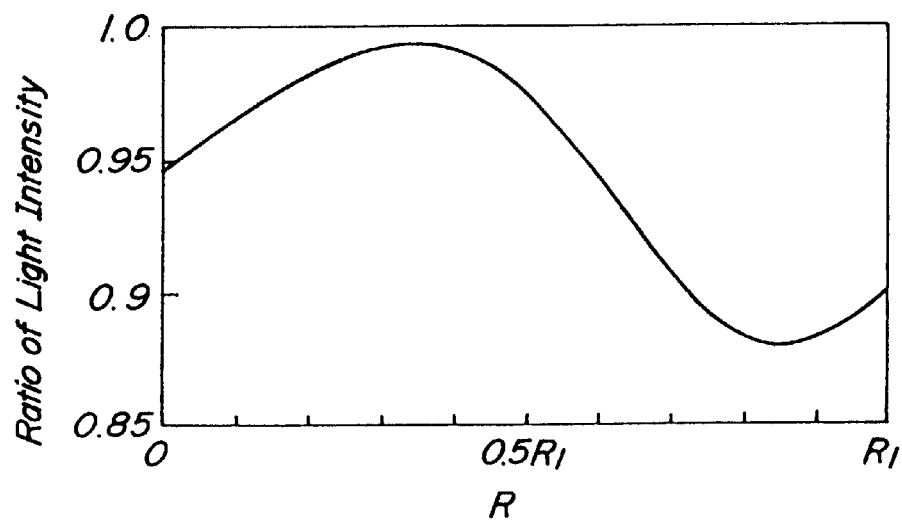
FIG_20
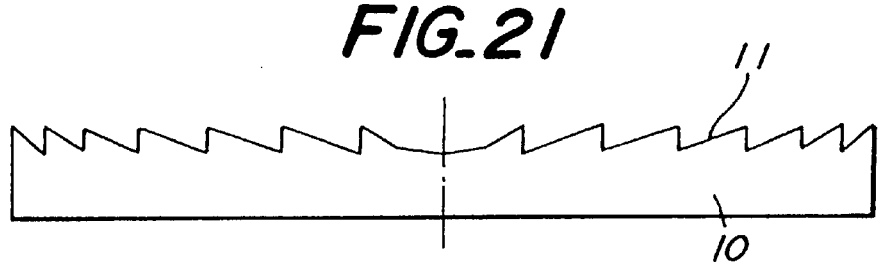
FIG_21

RELIEF TYPE DIFFRACTION OPTICAL ELEMENT, OPTICAL SYSTEM COMPRISING THE SAME AND MOLD FOR MANUFACTURING THE SAME

BACKGROUND OF THE INVENTION

1. Field of the Invention

The present invention relates to a relief type diffraction optical element comprising a substrate having a surface in which a given relief pattern is formed, an optical system comprising such a relief type diffraction optical element, an optical apparatus comprising such an optical system, and a mold for manufacturing the relief type diffraction optical element.

2. Description of the Related Art

In accordance with a recent tendency of miniaturization of optical systems, a relief type diffraction optical element such as a diffraction grating type lens has been watched, because the relief type diffraction grating can be made small in size and light in weight. For instance, the relief type diffractive lens is expected to be utilized in various fields due to the fact that chromatic aberration can be corrected effectively and aspherical performance can be attained easily.

It should be noted that the diffraction type lens means an optical element in which the lens function of a conventional refraction type lens such as a spherical lens, cylindrical lens and anamorphic lens is realized by the diffraction. For instance, a diffractive lens corresponding to the spherical lens includes a grating pattern of a plurality of concentric ring-shaped portions, and a diffraction type lens corresponding to the cylindrical lens comprises a rectilinear grating pattern. In the present specification, one groove of such a grating pattern is called a zone, and a zone at an optical axis of the diffraction type lens is termed as a first zone and successively outgoing zones are termed as second zone, third zone and so on.

When a parallel light flux is collected at a point by means of a lens, a phase shift function of this lens may be expressed by the following equation (1):

$$\phi(r) = -\pi r^2/(\lambda f) \quad (1)$$

r: distance from optical axis
λ: wavelength
f: focal length

When the angle $\phi(r)$ is transformed into a phase structure of $2\pi$, a phase shift function $\phi_d(r)$ of the diffraction type lens may be expressed by the following equation.

$$\phi_d(r) = \phi(r) + 2\pi(i-1) \quad (2)$$

$$R_{I-1} < r < R_I \ (i=1, 2, 3 \ldots)$$

This equation (2) means that the diffraction efficiency is optimized for the first-order diffraction. Here, $R_i$ is an outer radius of an $i^{th}$ zone. FIG. 1 shows the phase shift function $\phi(r)$ of the lens and the phase shift function FIG. 1 shows the phase shift function $\phi_d(r)$ of the diffraction type lens. It should be noted that a distance between outer radii of adjacent zones is termed as a pitch. A central zone of the diffraction type lens has a maximum width or pitch which is equal to a radius.

When the diffraction type lens is realized by the relief structure following the phase shift function, a height t(r) of the relief structure at a radius r may be expressed by the following equation.

$$t(r) = t_g \cdot [\{\phi_d(r)/2\pi\} + 1] \quad (3)$$

Here, $t_g$ is the maximum depth of the relief structure and may be represented as follows:

$$t_g = \lambda/(n-1) \quad (4)$$

wherein, n is a refractive index of a material of which a diffraction optical element is made.

It should be noted that the above equation (2) represents the phase shift function of the diffraction type lens which converges a parallel light flux at a point by means of a single diffraction type lens. When a diffraction type lens is used in combination with other optical element, e.g. a refraction type lens, a phase shift function of the diffraction type lens is generally expressed by a polynomial equation of even higher orders.

In JP-A Kokai Hei 1-250902, there is proposed a known diffraction optical element, in which all zones are formed to have an ideal curvilinear cross sectional configuration which follows a phase shift function. This known diffraction optical element has a sufficiently high optical performance.

In Japanese technical magazine, "Optical Technique Contact", Vol. 26, No. 3, pp. 208–212, there is described another known diffraction optical element, in which all zones are formed to have a rectilinear cross sectional configuration which approximates to an ideal curvilinear configuration following a phase shift function. Such a diffraction optical element can be manufactured easily.

The relief type diffraction optical element may be manufactured by various methods. In one manufacturing method, use is made of a mold with a bottom wall having a cross sectional configuration which is inverse to a relief pattern of a relief type diffraction optical element to be formed. The mold is pushed against a softened optical glass or plastic material to transfer the relief pattern of the bottom wall of the mold to the surface of the material. Alternatively, the relief pattern of the bottom wall of the mold may be transferred to an optical material by means of the injection molding method or photo-polymer method. In the above mentioned "Optical Technique Contact", Vol. 26, No. 3, page 212, there is proposed a known mold for manufacturing the relief type diffraction optical element, in which all zones of a relief pattern of the mold are formed to have a rectilinear configuration which approximates to an ideal curvilinear configuration following the phase shift function. It is apparent that such a mold can be manufactured easily.

FIG. 2 is a schematic cross sectional view showing a known relief type diffraction optical element, in which all zone are formed to have an ideal curvilinear cross sectional configuration which follows a given phase shift function. However, it is rather difficult to manufacture and check such a curvilinear cross sectional configuration. Moreover, a working time and a checking time are liable to be long. For instance, when an optical material is treated to have an ideal curvilinear cross sectional configuration by cutting, it is necessary to perform the cutting by means of a tip of a cutting edge of a byte. Then, it is difficult to obtain a good surface roughness as compared with a case in which the relief pattern is formed by using a whole length of the cutting edge.

In order to mitigate the above mentioned problem, there has been proposed another known relief type diffraction optical element shown in FIG. 3. In this known diffraction type lens, all zones are formed to have a rectilinear cross sectional configuration denoted by a solid line 3 in FIG. 3, said rectilinear configuration approximating an ideal curvilinear cross sectional configuration denoted by a broken line 4 which follows the phase shift function. This rectilinear configuration has great advantages in view of the manufacturing and checking operation. For instance, when the rectilinear configuration is formed by cutting, it is possible to use a whole length of the cutting edge, and therefore working date can be simplified and a good surface roughness can be attained.

However, when the rectilinear configuration is used for all zones, there is another problem that the optical performance is degraded as will be explained hereinbelow. Particularly, when the number of zones is small, the degradation of the optical performance might become very large.

Now it is assumed that a diffraction lens having a focal length f is formed such that all zones have a rectilinear cross sectional configuration, and a parallel light flux having a wavelength x is made incident upon the diffraction type lens. Then, a ratio of an intensity of light $I_R$ converged at a focal point of the diffraction type lens to an intensity of light $I_C$ converged at a focal point of the ideal diffraction type lens having a focal length f and an ideal curvilinear cross sectional configuration is considered. This ratio of light intensity at the focal point may be expressed as follows.

$$\text{Ratio of light intensity} = I_R / I_C \quad (5)$$

FIG. 4 is a graph showing a variation of the ratio of the intensity of light $I_R/I_C$ in accordance with the number of zones. As can be seen from the graph of FIG. 4, when the number of zones is large, the optical performance of the diffraction type lens having the rectilinear cross sectional configuration is not decreased so much, but the number of zones is small, the light intensity at the focal point is reduced to a large extent. This phenomenon could not be ignored when the number of zones through which light transmits is small like as a case in which a micro-lens or an image forming lens is used together with a stop.

Therefore, in an optical system constructed by using the relief type diffraction optical element, when light is made incident upon a small number of zones of the relief type diffraction optical element, a light intensity at a focal point is reduced to a large extent, and since a focussed spot expands laterally, MTF is reduced and a resolution is decreased.

In case of forming a mold for manufacturing a relief type diffraction optical element, it is desirable that the mold has a cross sectional configuration corresponding to a phase shift function of a relief type diffraction optical element to be manufactured. However, in practice, it is quite difficult to form a cross sectional configuration of the mold in accordance with a desired curvilinear shape. Therefore, all zones of a known mold are formed to have a rectilinear cross sectional configuration which approximates an ideal curvilinear cross sectional configuration. It is apparent that a relief type diffraction optical element manufactured by using such a mold has a corresponding rectilinear cross sectional configuration and its optical performance is degraded.

Furthermore, when a mold is manufactured by a lathe, in order to form a curvilinear cross sectional configuration, it is necessary to use only a tip of a cutting edge of a byte. In general, since a material of a mold is hardly worked, it is difficult to finish a mold surface as a mirror surface by means of such working. Therefore, a relief type diffraction optical element manufactured by such a mold has a large surface roughness. Then, a part of incident light is scattered by the diffraction type lens and a utilization efficiency is decreased. Moreover, the scattered light might become undesired stray light and the optical performance is degraded.

SUMMARY OF THE INVENTION

The present invention has for its object to provide a novel and useful relief type diffraction optical element which can be manufactured easily and has a superior converging performance so that a light intensity at a focal point can be increased.

It is another object of the invention to provide a relief type diffraction optical element, in which a light intensity at a light converging point is high, a surface roughness is small, light scattering is decreased and a utilization efficiency of incident light can be increased.

It is still another object of the invention to provide a novel and useful mold, by means of which a relief type diffraction optical element having a superior optical performance can be manufactured easily.

According to a first aspect of the invention, a relief type diffraction optical element having a non-even width grating pattern comprises a first zone group including at least one zone having a cross sectional configuration which is composed of a plurality of portions each having different inclination angles with respect to a plane perpendicular to an optical axis of the optical element, and a second zone group including a plurality of zones each having a cross sectional configuration which has a constant inclination angle with respect to said plane, wherein said first zone group contains a zone having a maximum width or pitch.

In a preferable embodiment of the relief type diffraction optical element according to the invention, a zone in said first zone group has a curvilinear cross sectional configuration which follows a phase shift function, and a zone in said second zone group has a rectilinear cross sectional configuration which approximates said curvilinear configuration following the phase shift function. In the present specification, the curvilinear cross sectional configuration includes not only a true curvilinear cross sectional configuration, but also includes a cross sectional configuration in which the true curvilinear cross sectional configuration is approximated by a large number of small rectilinear portions.

In another preferable embodiment of the relief type diffraction optical element according to the invention, a zone in said first zone group has a cross sectional configuration including at least two rectilinear portions which approximate a ideal curvilinear cross sectional configuration which follows a phase shift function, and a zone in said second zone group has a rectilinear cross sectional configuration which approximates said curvilinear configuration following the phase shift function.

In this relief type diffraction optical element, it is preferable to form one of said at least two rectilinear portions of a zone in said first zone group to be in parallel with the other major surface of the substrate. Such a relief type diffraction optical element can be manufactured much more easily.

In such a relief type diffraction optical element, it is preferable that said first zone group is consisting of a central zone only, said central zone has a cross sectional configuration formed by two rectilinear portions which cross at a cross point on coordinates (R, z) of the phase shift function, and said cross point satisfies the following condition:

$$0 \leq R \leq 0.59 R_I, \ z=0$$

where $R_I$ is an outer radius of the central zone. This relief type diffraction optical element has an intensity of light converged at a focal point which is higher than that of the known relief type diffraction optical element having all zones formed by a single rectilinear cross sectional configuration.

According to the invention, it is further preferable to form the central zone having a cross sectional configuration composed of the two rectilinear portions having a cross point within a range of $0.19R_1 \leq R \leq 0.47R_1$. Then, the ratio of light intensity at a focal point is not less than 0.98.

Furthermore, the relief type diffraction optical element according to the invention may be advantageously constructed as a diffraction type lens, in which the number of zones in said first zone group is not large than a half of a total number of zones. In such relief type diffraction optical element, it is possible to increase an intensity of light converged at a focal point without increasing the difficulty in manufacturing.

In the relief type diffraction optical element according to the invention, it is preferable that said first zone group is consisting of only central zone. In the diffraction type lens, the central zone has the maximum width or pitch, and therefore by forming the central zone to have a curvilinear cross sectional configuration or a configuration composed of at least two rectilinear portions, it is possible to obtain the relief type diffraction optical element having a practically acceptable performance.

In the relief type diffraction optical element according to the invention having the first zone group including the rectilinear portions, it is preferable that said first zone group is consisting of a central zone only, said central zone has a cross sectional configuration formed by two rectilinear portions which cross at a cross point on coordinates (R, z) of the phase shift function, said cross point is in a range of $\{0 \leq R \leq R_I, -2\pi \leq z \leq 0\}$ and satisfies the following condition:

$z > -2\pi R/R_I, z < -3\pi/R_I(R-3R_I/5)$, where $R_I$ is an outer radius of the central zone. Then, the relief type diffraction optical element has the ratio of light intensity at a focal point is not less than 0.98.

Moreover, in the relief type diffraction optical element according to the invention, said relief pattern may be preferably constructed by superimposing a surface having a diffraction faculty on a surface having a refraction faculty. In such a relief type diffraction optical element, In another preferable embodiment of the relief type diffraction optical element according to the invention, all zones in said first and second zone groups are formed to have a common rotation symmetric axis.

According to a second aspect of the invention, a mold for manufacturing a relief type diffraction optical element comprises:

a first zone group including at least one zone having a cross sectional configuration which is composed of a plurality of portions each having different inclinations with respect to a plane perpendicular to an optical axis of the optical element, said first zone group containing a zone having a maximum width or pitch; and a second zone group including a plurality of zones each having a cross sectional configuration which has a constant inclination angle with respect to said plane.

In a preferable embodiment of the mold for manufacturing a relief type diffraction optical element according to the invention, a zone in said first zone group has a curvilinear cross sectional configuration which follows a phase shift function, and a zone in said second zone group has a rectilinear cross sectional configuration which approximates said curvilinear configuration following the phase shift function.

In another preferable embodiment of the mold for manufacturing a relief type diffraction optical element according to the invention, a zone in said first zone group has a cross sectional configuration including at least two rectilinear portions which approximate a curvilinear cross sectional configuration which follows a phase shift function, and a zone in said second zone group has a cross sectional configuration including only one rectilinear portion which approximates said curvilinear configuration following the phase shift function.

In such a mold for manufacturing a relief type diffraction optical element, it is preferable that one of said at least two rectilinear portions of a zone in said first zone group is in parallel with a major surface of a relief type diffraction optical element to be formed by the mold the substrate.

In another preferable embodiment of the mold for manufacturing a relief type diffraction optical element according to the invention, said mold is formed for manufacturing a diffraction type lens, and the number of zones in said first zone group is not large than a half of a total number of zones.

In the mold for manufacturing a relief type diffraction optical element according to the invention, said first zone group may be preferably consisting of only at least one central zones.

Furthermore, in the mold for manufacturing a relief type diffraction optical element according to the invention, it is preferable that the mold is formed such that a relief type diffraction optical element formed by said mold includes a surface having a diffraction faculty superimposed on a surface having a refraction faculty.

The present invention also relates to an optical system including the relief type diffraction optical element according to the invention.

In a preferable embodiment of the optical system according to the invention, said optical system further comprises an aperture stop having a variable aperture area.

The present invention also relates to an optical apparatus comprising the relief type diffraction optical element according to the invention.

The present invention further relates to an imaging optical system for use in an endoscope comprising the relief type diffraction optical element according to the invention.

BRIEF DESCRIPTION OF THE DRAWINGS

FIG. 4 is a graph showing a variation of an intensity of light converged at a focal point of the known diffraction type lens illustrated in FIG. 3;

FIG. 5 is a graph representing a variation of an intensity of light converged at a focal point of the diffraction type lens illustrated in FIG. 3;

FIG. 6 is a graph showing a variation of an intensity of light converged at a focal point of the diffraction type lens according to the invention;

FIG. 11 is a schematic cross sectional view showing a second embodiment of the mold according to the invention;

FIG. 12 is a schematic cross sectional view showing a third embodiment of the relief type diffraction optical element according to the invention;

FIG. 13 is an enlarged cross sectional view depicting a central portion of the optical element shown in FIG. 12;

FIG. 14 is a schematic view representing a variation of an intensity of light converged at a focal point of the diffraction type lens of FIG. 13 in accordance with a cross point of two rectilinear portions;

FIG. 15 is a schematic cross sectional view illustrating a fourth embodiment of the relief type diffractive lens according to the invention;

FIG. 16 is a schematic cross sectional view illustrating a fifth embodiment of the relief type diffractive lens according to the invention;

FIG. 17 is a schematic cross sectional view illustrating a sixth embodiment of the relief type diffractive lens according to the invention;

FIG. 18 is an enlarged view of a central portion of the lens shown in FIG. 17;

FIG. 19 is a schematic view representing a variation of an intensity of light converged at a focal point of the lens shown in FIG. 18;

FIG. 20 is a graph showing a variation of an intensity of light converged at a focal point in accordance with coordinates of a cross point between two rectilinear portions of the lens shown in FIG. 17;

FIG. 21 is a schematic cross sectional view illustrating a third embodiment of the mold according to the invention;

DESCRIPTION OF THE PREFERRED EMBODIMENT

Figure 1:
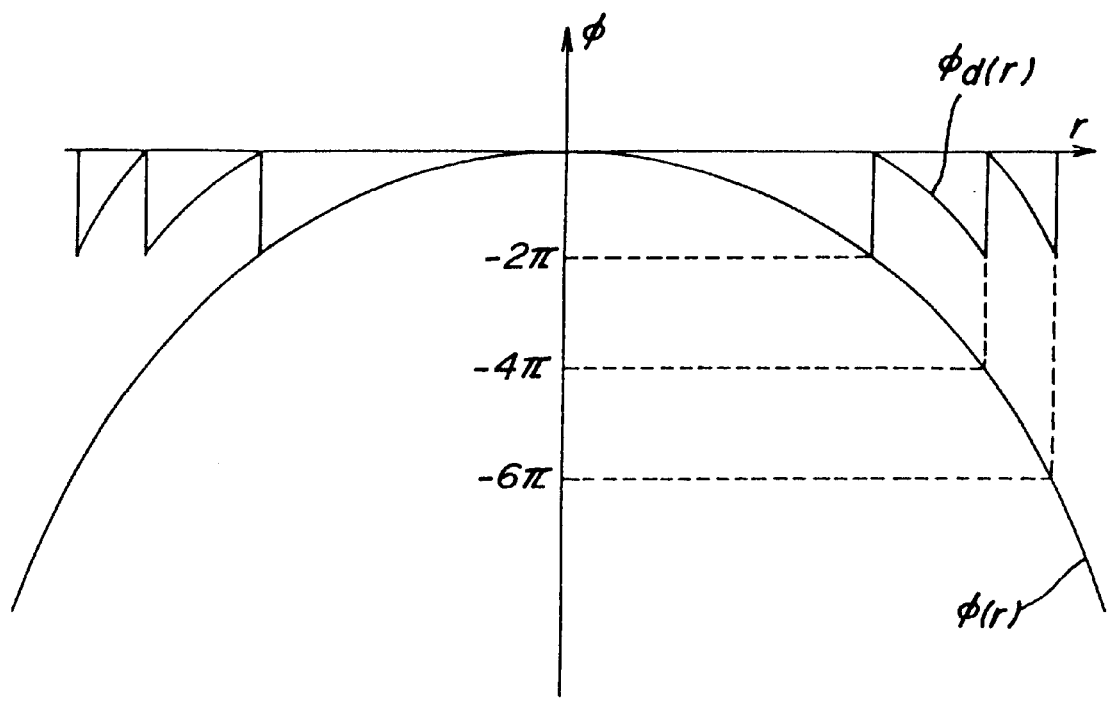
FIG. 1 is a schematic view showing a relationship between a radius and a height of a relief type diffractive lens having a cross sectional configuration following a phase shift function.
Figure 2:
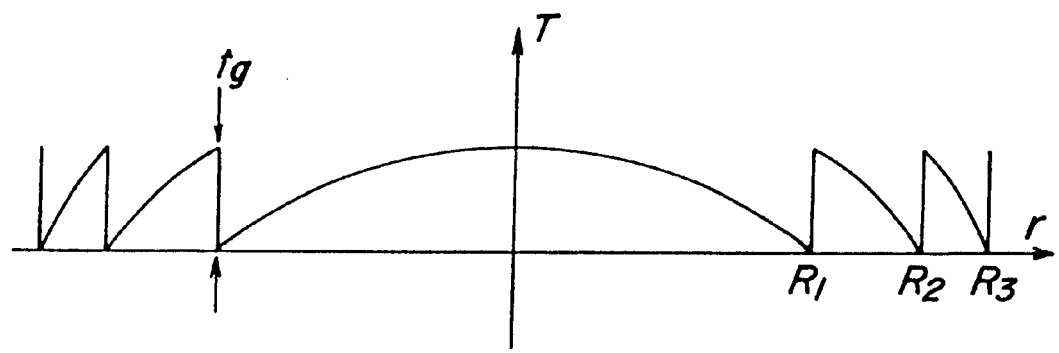
FIG. 2 is a schematic cross sectional view illustrating a known relief type diffractive lens having the ideal cross sectional configuration shown in FIG. 1.

At first, the influence of the cross sectional configuration of the relief type diffraction optical element upon an intensity of light converged at a focal point will be explained with reference to a diffraction type lens in which an incident parallel light flux is converged at a focal point. In the following explanation, $\lambda$ denotes a wavelength of the light and f expresses a focal length of the lens. According to the analysis of the present inventor, it has been confirmed that when the number of zones is small, an intensity of light at the focal point can be increased to a great extent by forming only a central zone of the diffraction type lens to have a curvilinear cross sectional configuration following a phase shift function as compared with a known relief type diffraction grating lens in which all zones are formed to have a rectilinear cross sectional configuration which approximates an ideal configuration following the phase shift function.

FIG. 5 is a graph showing a change in the intensity of light converged at the focal point of the relief type diffractive lens according to the invention, in which only the central zone is formed to have an ideal curvilinear cross sectional configuration following the phase shift function, and all the remaining zones have a rectilinear cross sectional configuration approximating the phase shift function. A relative intensity of light is represented as a ratio of light intensity which is defined by the following equation.

Ratio of Light Intensity=$I_S/I_C$ (6)

Here, $I_C$ is a light intensity of the relief type diffractive lens in which all zones are formed to have an ideal curvilinear cross sectional configuration defined by the phase shift function and $I_S$ is a light intensity of the above mentioned relief type diffractive lens according to the invention in which only the central zone is formed to have an ideal curvilinear cross sectional configuration following the phase shift function.

As can be seen from FIG. 5, any remarkable decrease in the light intensity is not found in the relief type diffractive lens according to the invention in which only the central zone having the maximum width or pitch is formed to have a desired curvilinear cross sectional configuration following the phase shift function. For instance, when the number of zones is set to ten, the ratio of light intensity of the lens according to the invention is almost equal to 1.0. As shown in FIG. 4, in the known relief type diffractive lens in which all zones are formed to have a rectilinear cross sectional cross section approximating the phase shift function, the ratio of light intensity is decreased to about 0.9.

As explained above, when the maximum width or pitch central zone is formed to have a curvilinear cross sectional shape following the phase shit function, the decrease in the intensity of light converged at the focal point can be substantially avoided. In the known relief type diffraction grating lens, a deviation of the rectilinear cross sectional configuration 3 from the ideal curvilinear cross sectional configuration 4 becomes maximum in the central zone, and this is a major cause of degradation in the optical performance of the known diffraction type lens. According to the invention, since the center zone having the maximum width or pitch is formed in accordance with the ideal curvilinear shape following the phase shift function, it is possible to improve the optical performance to a great extent.

The above explanation may be equally applied to the relief type diffractive lens according to the invention in which only the central zone having the maximum width or pitch is formed to have at least two rectilinear cross sectional portions approximating the phase shift function. Now this will be explained.

FIG. 6 is a graph showing a change in the ratio of intensity of light converged at the focal point of the relief type diffractive lens according to the invention, in which only the central zone having the maximum width or pitch is formed to have two rectilinear cross sectional portions approximating the phase shift function, and all the remaining zones have a rectilinear cross sectional configuration approximating the phase shift function. In this case, the relief type diffractive lens according to the invention is optimized for the first-order diffraction and is formed such that the two rectilinear lines in the central zone cross at a point having coordinates $\{0.55 \cdot R_1, 0.25 \cdot (-2\pi)\}$ of the phase shift function. Here, $R_1$ is an outer radius of the central zone.

Also in this case, when the number of zones is set to ten, the decrease in the light intensity at the focal point is very small and the ratio of intensity of light amounts to about 0.994.

As explained above, according to the invention, at least the maximum width or pitch central zone is formed to have a cross sectional configuration which is composed of a plurality of portions each having different inclination angles with respect to a plane perpendicular to an optical axis of the optical element, and therefore the intensity of light converged at the focal point can be increased to a great extent. It should be noted that by increasing the number of zones belonging to the first zone group, the intensity of light converged at the focal point can be further increased.

In this manner, according to the invention, it is possible to realize the relief type diffraction optical element having the increased intensity of light converged at the focal point in regardless of the number of zones through which the light is transmitted without increasing the difficulty of manufacture.

Figure 7:
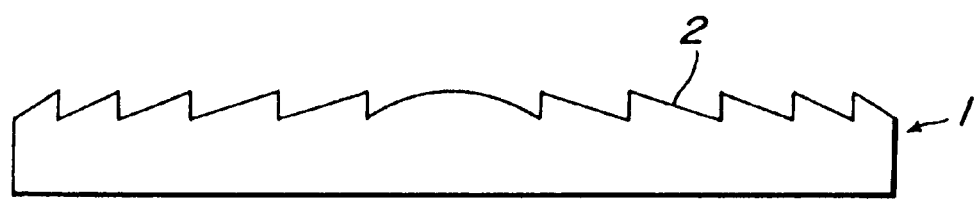
FIG. 7 is a schematic cross sectional view illustrating a first embodiment of the relief type diffractive lens according to the invention.
Figure 8:
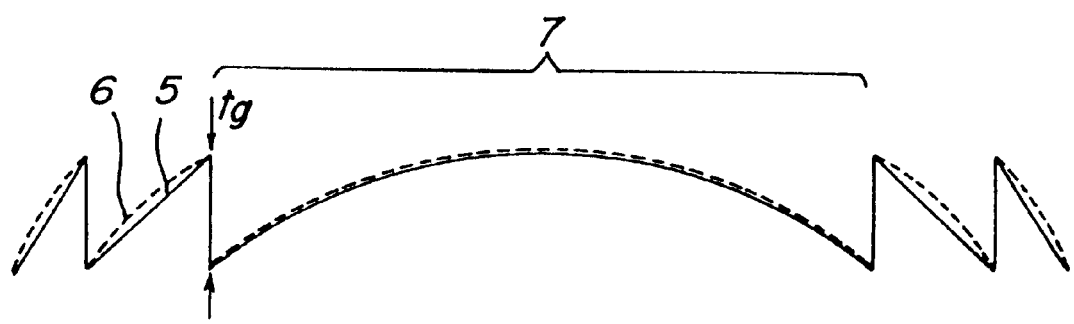
FIG. 8 is an enlarged cross sectional view showing a central portion the diffraction type lens shown in FIG. 7.

FIGS. 7 and 8 are schematic cross sectional views showing a first embodiment of the relief type diffraction optical element according to the invention. This optical element 1 is formed as a diffraction type lens which converges a parallel light flux having a wavelength λ at a point of focal length f. In the present embodiment, one of opposing major surfaces of a plane parallel substrate made of an optical glass is formed to have a non-even width relief type diffraction pattern 2 consisting of concentric zones each having a cross sectional configuration which is symmetrical about an optical axis. In all drawings showing embodiments of the optical element according to the invention, the relief pattern is shown only schematically and does not represent actual configuration accurately.

FIG. 8 is an enlarged view depicting a central portion of the relief type lens 1 shown in FIG. 7. The non-even width diffraction pattern 2 is optimized for the first-order diffraction light, and the maximum depth $t_g$ of respective zones is set to $\lambda/(n-1)$, wherein n is a refractive index of the substrate material for the wavelength λ. In FIG. 8, a solid line denotes a cross sectional configuration 5 of the diffraction type lens and a broken line represents an ideal cross sectional configuration 6 which follows a phase shift function. A central first zone 7 having a maximum width or pitch is formed to have a curvilinear cross sectional configuration which is identical with the ideal configuration 6. In FIG. 8, the curvilinear cross sectional configuration 5 in the central zone f the diffraction type lens is shown to be slightly deviated from the real configuration 6 for the sake of clarity. All the remaining zones have a rectilinear cross sectional configuration which approximates the ideal curvilinear cross sectional configuration 6.

In general, in the diffraction type lens, the central zone has a maximum width or pitch, and therefore by forming only the central zone 7 to have the ideal curvilinear cross sectional configuration following the phase shift function, it is possible to realize the diffraction type lens which can be manufactured easily and has a high intensity of light converged at the focal point. Particularly, by adopting such a construction, it is possible to avoid a large decrease in the light intensity at the focal point even if the number of zones is small or a light flux passes through a smaller number of zones although the total number of zones is large.

Figure 9:
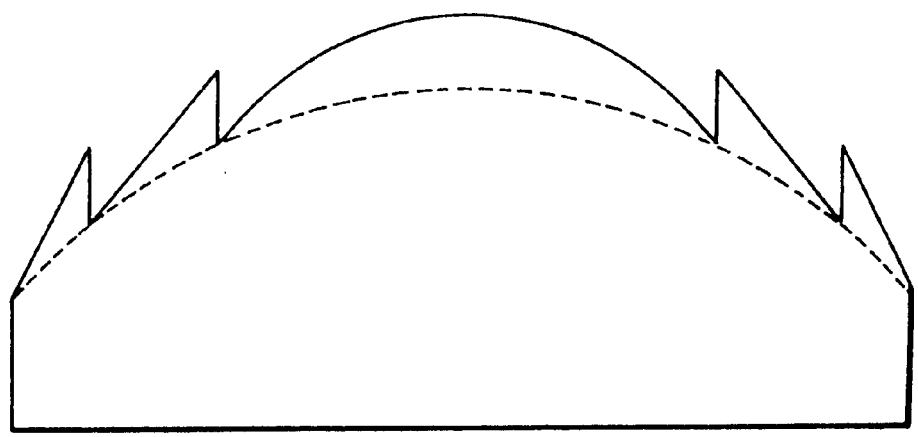
FIG. 9 is a schematic cross sectional view depicting a second embodiment of the relief type diffractive lens according to the invention.

FIG. 9 is a schematic cross sectional view showing a second embodiment of the relief type diffraction grating according to the invention. In the present embodiment, use is made of a substrate having a plane-convex shape and the non-even width relief type diffraction grating pattern is formed in a convex surface. In the present embodiment, a necessary power of the lens is obtained by a combination of the refractive spherical surface and the non-even width diffraction pattern, it is possible to widen pitches of the diffraction pattern. Therefore, by forming only the central zone to have the ideal curvilinear cross sectional configuration, the intensity of light converged at the focal point can be increased. Also in this case, the non-even width diffraction grating pattern may be also formed on the plane surface of the substrate.

In the above embodiments, only the central zone having the maximum width or pitch is formed to have the ideal curvilinear cross sectional configuration following the phase shift function, but according to the invention, a plurality of zones may be formed to have such an ideal configuration. For instance, not only the first central zone, but also a second zone may be formed to have the curvilinear cross sectional configuration. Then, the optical performance is further improved. However, in a practical view point, in many cases it is sufficient to form only the central zone in accordance with the phase shift function.

In the above embodiments, the non-even width diffraction grating pattern 2 is optimized for the first-order diffracted light, but according to the invention, the grating pattern may be optimized for other diffraction order. Now it is assumed that the grating pattern is optimized for an m-order diffracted light, a maximum depth $t_g$ of respective zones may be determined as follows.

$$t_g = m\lambda/(n-1)$$

Further, in the above embodiments, the non-even width diffraction grating pattern 2 is formed as a transmission type, but according to the invention, it may be formed as a reflection type. In the reflection type, a maximum depth $t_g$ may be expressed in the following manner $$t_g = m\lambda/2 \ (m: \text{diffraction order of reflection})$$

Moreover, the non-even width grating pattern 2 is not limited to the concentric shape, but may be formed into a rectilinear shape corresponding to a cylindrical lens or an elliptical shape. The substrate of the optical element is not limited to the optical glass, but may be made of other optical material such as plastics, optical crystal and metal.

Figure 10:
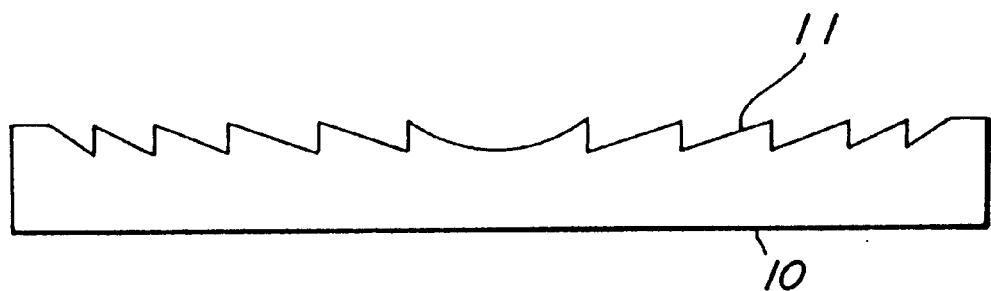
FIG. 10 is a schematic cross sectional view illustrating a first embodiment of the mold according to the invention.

FIG. 10 is a schematic cross sectional view showing an embodiment of the mold according to the invention. A mold 10 of this embodiment is used to manufacture a non-even width relief type diffractive lens having a positive power. The mold 10 comprises a plane-parallel substrate made of a mold material such as WC (tungsten carbide) having opposing major surfaces. One of the major surfaces is formed a non-even width grating pattern 11 which is an inversion of a non-even width grating pattern of a relief type diffractive lens to be manufactured. The other major surface is polished to be flat. The non-even width grating pattern 11 has a concentric shape, and depth and cross sectional configuration of respective zones corresponding to those which are optimized for the first-order diffracted light.

A central zone having a maximum width or pitch of the non-even width grating pattern 11 has a curvilinear cross sectional configuration which is inverse to an ideal curvilinear cross sectional configuration following a phase shift function of a diffraction type lens to be manufactured by said mold. The remaining zones are formed to have a rectilinear cross sectional configuration which is inverse to a rectilinear cross sectional configuration of the diffraction type lens which approximates to the phase shift function. It should be noted that a material of a lens is shrunk during the working, the mold 10 has to be formed to compensate such a shrinkage.

The mold 10 of the present embodiment, only the central zone having the maximum width or pitch is formed to have a curvilinear cross sectional configuration which is inverse to the ideal cross sectional configuration following the phase shift function, and therefore the mold can be manufactured easily. Therefore, by using such a mold 10, it is possible to manufacture a relief type diffractive lens including a central zone having the ideal curvilinear cross sectional configuration corresponding to a phase shift function and the remaining zones having the rectilinear cross sectional configuration which approximates the phase shift function. As stated above, such a diffraction type lens has a superior optical performance.

In the present embodiment, the mold 10 is made of WC, but it may be made of other material such as SiC (silicon carbide) and NiP. When a diffraction type lens is made of an optical glass, it is desired to use WC and SiC, and when a diffraction type lens is made of plastics, the mold is preferably made of NiP.

Moreover, the non-even width grating pattern 11 of the mold 10 is not limited to the concentric shape, but may be formed into a rectilinear shape or an elliptical shape in accordance with a relief type diffraction optical element to be manufactured.

FIG. 11 is a schematic cross sectional view illustrating a second embodiment of the mold according to the invention. In the previous embodiment shown in FIG. 10, the non-even width grating pattern 11 is formed in the surface of the plane-parallel substrate, but in the present embodiment the non-even width grating pattern is formed in a spherical surface. By using such a mold, it is possible to manufacture the relief type diffractive lens depicted in FIG. 9 can be manufactured. In this relief type diffractive lens, a lens power due to the diffraction grating can be reduced by a lens power due to the spherical surface, and thus pitches of the diffraction grating can be increased. Therefore, by forming the central zone having the maximum width or pitch to have a cross sectional configuration which is inverse to an ideal curvilinear cross section following a phase shift function, it is possible to manufacture a diffraction type lens having a higher intensity of light converged at a focal point.

FIG. 12 is a schematic cross sectional view illustrating a third embodiment of the relief type diffraction optical element according to the invention. This optical element 1 is formed as a diffraction type lens which converges a parallel light flux having a wavelength λ at a point of focal length f. Also in the present embodiment, one of opposing major surfaces of a plane parallel substrate made of an optical glass is formed to have a non-even width relief type diffraction pattern 2 consisting of concentric zones each having a cross sectional configuration which is symmetrical about an optical axis.

FIG. 13 is an enlarged view depicting a central portion of the relief type lens 1 shown in FIG. 12. The non-even width diffraction pattern 2 is optimized for the first-order diffracted light, and the maximum depth $t_g$ of respective zones is set to $\lambda/(n-1)$, wherein n is a refractive index of the substrate material for the wavelength λ. In FIG. 13, a solid line denotes a cross sectional configuration 5 of the diffraction type lens and a broken line represents an ideal cross sectional configuration 6 which follows a phase shift function. A central first zone 7 having a maximum width or pitch is formed to have a cross sectional configuration composed of two rectilinear portions which approximate the ideal cross sectional configuration following the phase shift function. All the remaining zones of the lens are formed to have a rectilinear cross sectional configuration which approximates to the ideal curvilinear cross sectional configuration 6 like as the previous embodiments. In this case, the relief type diffractive lens is optimized for the first-order diffraction and is formed such that the two rectilinear lines in the central zone 7 cross at a point having coordinates $\{0.55 \cdot R_1, 0.25 \cdot (-2\pi)\}$ of the phase shift function.

As stated above, the central zone 7 of the diffraction type lens has a maximum width or pitch. Therefore, when only the central zone 7 is formed to have a cross sectional configuration which is composed of the two rectilinear portions approximating to the phase shift function, it is possible to realize the diffraction type lens which has a higher intensity of light converged at the focal point than the known diffraction type lens in which all zones are formed to have a single rectilinear portion. This feature is particularly advantageous when the number of zones is small or a light flux passes through a smaller number of zones although the total number of zones is large.

In case of manufacturing the diffraction type lens 1 shown in FIG. 12 by cutting by means of a byte, the cutting operation can be performed easily, because all the zones of the lens are formed to have a rectilinear cross sectional configuration. That is to say, in this case all the zones can be formed by the cutting edge of the byte. Therefore, the working date becomes simpler and a better surface roughness can be attained as compared with a case in which the cutting is performed by a front tip of the cutting edge of the byte.

In the embodiment shown in FIG. 12, the diffraction type lens is constructed as the convex lens, but according to the invention, the diffraction type lens may be constructed as the concave lens. When the diffraction type lens having the concave lens function is manufactured by cutting with the byte, it is necessary to form a portion of the central zone near the optical axis by using the tip of the cutting edge of the byte. However, a whole surface of the lens has a better roughness than a case in which a whole surface is formed by the tip of the cutting edge of the byte.

In the embodiment shown in FIG. 12, the central zone 7 is formed to have a cross sectional configuration including the two rectilinear portions which cross with each other at a point of $\{0.5 \cdot R_1, 0.25 \cdot (-2\pi)\}$ on the coordinates of the phase shift function. This will be further explained.

FIG. 14 is a schematic view showing a variation of the ratio of an intensity of light at the converging focal point of the diffraction type lens when the coordinates of the crossing point between the two rectilinear portions constituting the cross sectional configuration of the central zone 7 within a range of $(0 \leq R \leq R_I, -2\pi \leq z \leq 0)$ on the coordinates of the phase shift function. A center point of respective squares in FIG. 14 expresses a crossing point of the two rectilinear portions and a density of hatching in respective squares represents the ratio of light intensity. A white square denotes the ratio not less than 0.98. As can be understood from FIG. 14, it is preferable that the coordinates of the crossing point of the two rectilinear portions in the central zone 7 satisfies the following condition:

$$z > -2\pi R/R_I, \quad z < -\frac{3\pi}{R_1}\left(R - \frac{3}{5}R_1\right)$$

where $R_I$ is an outer radius of the central zone.

Figure 3:
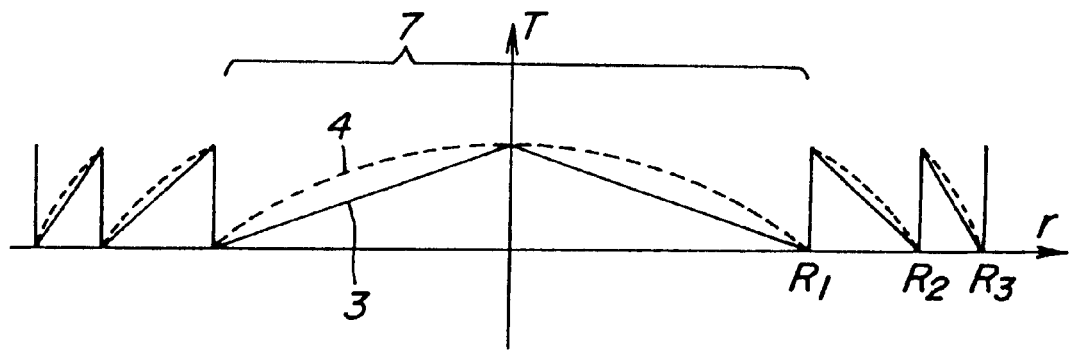
FIG. 3 is a schematic view depicting a known relief type diffractive lens having all zones formed by a rectilinear cross sectional configuration.

In the known diffraction type lens in which each of all the zones is formed to have a single rectilinear portion as shown in FIG. 3, the ratio of an intensity of light converged at a focal point becomes about 0.94. In FIG. 14, black squares denote a region having the ratio of an intensity of light smaller than 0.94. Therefore, according to the invention, it is meaningless to set the crossing point in the region denoted by the black squares.

FIG. 15 is a schematic cross sectional view showing a fourth embodiment of the relief type diffractive lens according to the invention. In the embodiment shown in FIGS. 12 and 13, the two rectilinear portions of the central zone are set under such a condition that positions of both ends of the central zone are fixed to (0,0) and (0, −2π) on the coordinates of the phase shift function. In the embodiment illustrated in FIG. 15, a coordinate $z_0$ on the z axis is set to a value not equal to zero such that a deviation from the ideal curvilinear shape.

FIG. 16 is a schematic cross sectional view showing a fifth embodiment of the relief type diffraction grating according to the invention. In the present embodiment, use is made of a substrate having a plane-convex shape and the non-even width relief type diffraction grating pattern is formed in a convex surface. The central zone of the diffraction type lens of the present embodiment is formed to have a cross sectional configuration composed of two rectilinear portions. In the present embodiment, it is possible to widen pitches of the diffraction pattern, and thus it is very effective to form only the central zone to have a cross sectional configuration composed of the two portions in order to increase an intensity of light converged at the focal point. Also in this case, the non-even width diffraction grating pattern may be formed in the both major surfaces of the substrate.

In the above embodiments shown in FIGS. 12, 15 and 16, only the central zone having the maximum width or pitch is formed to have the cross sectional configuration composed of the two rectilinear portions approximating the ideal curvilinear configuration following the phase shift function, but according to the invention, more than one zones may be formed to have a cross sectional configuration composed to two rectilinear portions. For instance, not only the first central zone, but also a second zone may be formed to have such a cross sectional configuration. Then, the optical performance is further improved.

In the above embodiments shown in FIGS. 12, 15 and 16, the non-even width diffraction grating pattern 2 is optimized for the first-order diffraction, but according to the invention, the grating pattern may be optimized for other diffraction order. When the grating pattern is optimized for an m-order diffraction, a maximum depth $t_g$ of respective zones may be determined as follows.

$$t_g = m\lambda/(n-1)$$

When the diffraction pattern is optimized for a higher order diffraction, a deviation of a cross sectional configuration of the known diffraction type lens in which a respective one of all zones is formed to have a single rectilinear portion becomes further large, and thus an optical performance is degraded to a large extent. The relief type diffraction optical element in which the central zone is formed to have a cross sectional configuration composed of the two rectilinear portions according to the invention can remove such a drawback, because a deviation of the cross sectional configuration from the ideal curvilinear cross sectional configuration can be reduced. In this case, the optical performance will be further improved by forming the central zone to have a cross sectional configuration composed of more than three rectilinear portions.

In the above embodiments shown in FIGS. 12, 13, 15 and 16, the diffraction type lens having the non-even width diffraction grating pattern 2 is formed as a transmission type, but according to the invention, it may be formed as a reflection type. In the reflection type, a maximum depth $t_g$ may be expressed in the following manner.

$$t_g = m\lambda/2 \text{ } (m: \text{ diffraction order of reflection})$$

Moreover, the non-even width grating pattern 2 shown in FIGS. 12, 13, 15 and 16 is not limited to the concentric shape, but may be formed into a rectilinear shape corresponding to a cylindrical lens or an elliptical shape. The substrate of the optical element is not limited to the optical glass, but may be made of other optical material such as plastics, optical crystal and metal.

FIG. 17 is a schematic cross sectional view showing sixth embodiment of the relief type diffractive lens according to the invention. In the present embodiment, the diffraction type lens comprises a plane-parallel substrate made of an optical glass and having a relief pattern consisting of a non-even width grating pattern 2 having a concentric structure which is symmetrical about an optical axis.

FIG. 18 is an enlarged view illustrating a central portion of the lens shown in FIG. 17. The non-even width grating pattern 2 is optimized for the first-order diffraction and each zones have the maximum depth $t_g=\lambda/(n-1)$. Here, n is a refractive index of the substrate material at a wavelength of λ. As illustrated in FIG. 18, a central zone 7 has a cross sectional configuration 3 composed of two rectilinear portions which approximate the ideal curvilinear cross sectional configuration 4 following the phase shift function. Further, in the present embodiment, one of the two rectilinear portions in the central zone 7 is in parallel with the rear surface of the substrate. That is to say, coordinates of a crossing point of the two rectilinear portions are set to $(0.34R_1, 0)$ on the coordinates of the phase shift function.

FIG. 19 is a graph showing a variation of the ratio of an intensity of light converged at the focal point of the diffraction type lens shown in FIG. 18 in accordance with the number of zones. For instance, when the number of zones is set to ten, the ratio of an intensity of light at the focal point becomes about 0.988 which is slightly lower than that of the embodiment shown in FIGS. 12 and 13, but is still higher than that of the known diffraction type lens in which all the zones are formed to have a single rectilinear cross sectional configuration, in which the ratio of an intensity of light is about 0.90.

In the present embodiment, since one of the two rectilinear portions of the central zone is formed to be in parallel with the rear surface of the substrate, the diffraction type lens can be manufactured and checked much more easily. That is to say, the central zone including the two rectilinear portions can be manufactured by a single cutting operation by means of the cutting tool. Moreover, all the zones of the diffraction type lens can be manufactured by using the cutting edge of the byte, and thus it is possible to attain a better surface roughness.

In the embodiments shown in FIGS. 12–18, the diffraction type lens has a convex lens function, i.e. a positive power, but according to the invention, the diffraction type lens may be formed to have the concave lens function, i.e. a negative power. In case of manufacturing the diffraction type lens having a negative power by cutting a substrate by means of a byte, it is necessary to form the two rectilinear portions of the central zone by separate cutting operations. Therefore, in case of manufacturing the diffraction type lens shown in FIGS. 17 and 18, it is necessary to form the rectilinear portion which is parallel with the rear surface of the substrate by means of a tip of the cutting edge of the byte. However, an adjustment of an angle of the byte becomes simpler as compared with a case of manufacturing the diffraction type lens shown in FIGS. 12–17, in which the central zone is formed to have a cross sectional configuration composed to the two rectilinear portions whose inclination angles with respect to the plane perpendicular to the optical axis are not zero.

Furthermore, in the above explanation, the crossing point between the two rectilinear portions of the central zone is set at the point having the coordinates ($0.3R_1$, 0) on the phase shift function, but according to the invention, the crossing point may be set to another coordinates. This will be further explained in detail.

FIG. 20 is a graph showing a variation of the light intensity ratio of the diffraction type lens having the central zone whose cross sectional configuration is composed of the two rectilinear portions when the crossing point between the two rectilinear portions is varied within a range of ($0 \leq R \leq R_f$, z=0). The diffraction type lens has twenty zones. In FIG. 20, a horizontal axis denotes a position of the crossing point (R axis) and a vertical axis represents the ratio of an intensity of light converged at a focal point. As can be seen from FIG. 20, when the crossing point between the two rectilinear portions in the central zone of the diffraction type lens is set to a value within a range of ($0<R<0.59R_1$), the light intensity ratio is larger than that of the known diffraction type lens in which all zones are formed to have a single rectilinear cross sectional configuration as shown in FIG. 3. Furthermore, when the crossing point between the two rectilinear portions in the central zone of the diffraction type lens is set to a value within a range of ($0.19R_1 \leq R \leq 0.47R_1$), the light intensity ratio becomes not less than 0.98.

As explained above with reference to FIG. 16, the grating pattern according to the invention may be formed in a convex spherical surface of a plano-convex substrate. Then, pitches of the refraction type lens can be increased. In this case, when the central zone is formed to have a cross sectional configuration composed of two rectilinear portions one of which has an inclination angle of zero, the effect is further increased.

FIG. 21 is a schematic cross sectional view showing a third embodiment of the mold according to the invention for manufacturing the non-even width relief type diffraction grating lens having a positive power as shown in FIG. 12. The mold 10 comprises a plane-parallel substrate made of a mold material such as WC having opposing major surfaces. One of the major surfaces is formed a non-even width grating pattern 11 which is an inversion of a non-even width grating pattern of a relief type diffraction grating lens to be manufactured. The other major surface is polished to be flat. The non-even width grating pattern 11 has a concentric shape, and depth and cross sectional configuration of respective zones corresponding to those which are optimized for the first-order diffracted light.

A central zone having a maximum width or pitch of the non-even width grating pattern 11 has a cross sectional configuration inverse to a cross sectional configuration composed of two rectilinear portions which approximate the ideal curvilinear cross sectional configuration following a phase shift function. The remaining zones are formed to have a rectilinear cross sectional configuration which is inverse to a rectilinear cross sectional configuration of the diffraction type lens which approximates to the phase shift function. It should be noted that a material of a lens is shrunk during the working, the mold 10 has to be formed to compensate such a shrinkage.

In the mold 10 of the present embodiment, since all the zones are formed to have one or two rectilinear portions, the mold can be manufactured easily by cutting. In this case, for the central zone, the rectilinear portion near the optical axis has to be formed by using a tip of a cutting edge of a byte, a whole surface of the mold 10 has a better surface roughness as compared with a known mold in which all zones are formed to have a cross sectional configuration following a phase shift function.

By using the above explained mold 10, it is possible to manufacture the relief type diffractive lens including a central zone having a cross sectional configuration composed of the two rectilinear portions which approximate the ideal curvilinear cross sectional cross sectional configuration following the phase shift function. As stated above, such a diffraction type lens has a superior optical performance.

Figure 22:
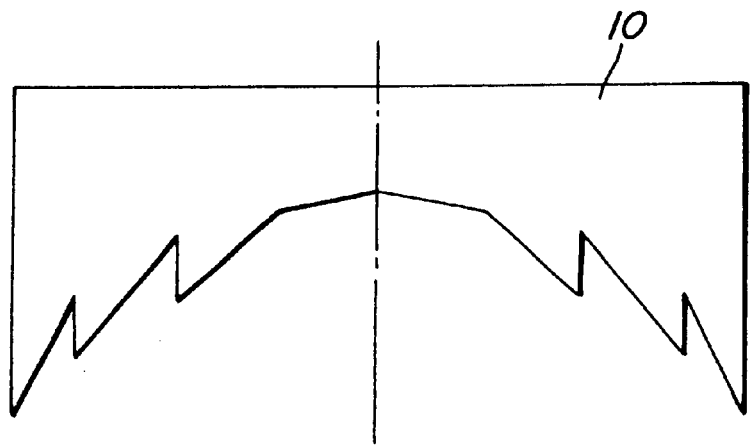
FIG. 22 is a schematic cross sectional view depicting a fourth embodiment of the mold according to the invention.

FIG. 22 is a schematic cross sectional view illustrating a fourth embodiment of the mold according to the invention. In the embodiment shown in FIG. 21, the non-even width grating pattern 11 is formed in the surface of the plane-parallel substrate, but in the present embodiment the non-even width grating pattern is formed in a spherical surface. By using such a mold 10', the relief type diffractive lens shown in FIG. 16 can be manufactured. In this relief type diffractive lens, a necessary positive lens power is attained by a combination of a lens power due to the diffraction grating and a lens power due to the spherical surface, and thus pitches of the diffraction grating can be increased. Therefore, the effect of forming the central zone having the large pitch to have a cross sectional configuration composed of the two rectilinear portions becomes manifest.

Figure 23:
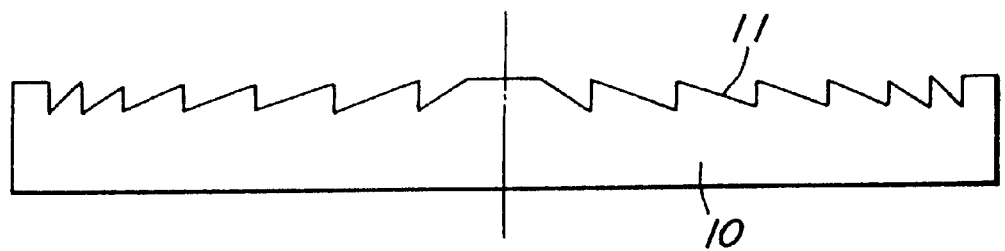
FIG. 23 is a schematic cross sectional view showing a fifth embodiment of the mold according to the invention.

FIG. 23 is a schematic cross sectional view illustrating a fifth embodiment of the mold according to the invention. In the present mold 10 has a non-even width grating pattern 11 which is inverse to a non-cross sectional configuration of the diffraction type lens having a negative power. In the present embodiment, a central zone of the non-even width grating pattern 11 is composed of two rectilinear portions, one of which is in parallel with the rear surface of the substrate. In the present embodiment, one of the two rectilinear portions of the central zone is in parallel with the substrate surface, the central zone can be formed by a single cutting operation. Therefore, the mold 10 of the present embodiment can be manufactured much more easily. Further, all the zones of the non-even width grating pattern 11 can be formed by using a cutting edge of a byte, and thus the mold has an improved surface roughness.

It should be noted that the molds 10 shown in FIGS. 21–23 may be made of other material than WC. For instance, SiC and NiP may be used. When a diffraction type lens is made of an optical glass, it is desired to use WC and SiC, and when a diffraction type lens is made of plastics, the mold is preferably made of NiP.

Moreover, the non-even width grating patterns 11 of the molds 10 illustrated in FIGS. 21–23 are not limited to the concentric shape, but may be formed into a rectilinear shape or an elliptical shape in accordance with a relief type diffraction optical element to be manufactured.

Furthermore, the molds 10 shown in FIG. 23 is used to manufacture the diffraction type lens having a negative power, but according to the invention, the mold may be formed to manufacture the diffraction type lens having a positive power as shown in FIGS. 17 and 18. In case of forming the mold for manufacturing the diffraction type lens having a positive power by cutting, an adjustment of an angle of the cutting byte can be simplified as compared with a case of forming the mold shown in FIGS. 21 and 22, in which the central zone is formed to have a cross sectional configuration composed of the two rectilinear portions whose inclination angles with respect to the plane perpendicular to the optical axis are not zero.

Figure 24:
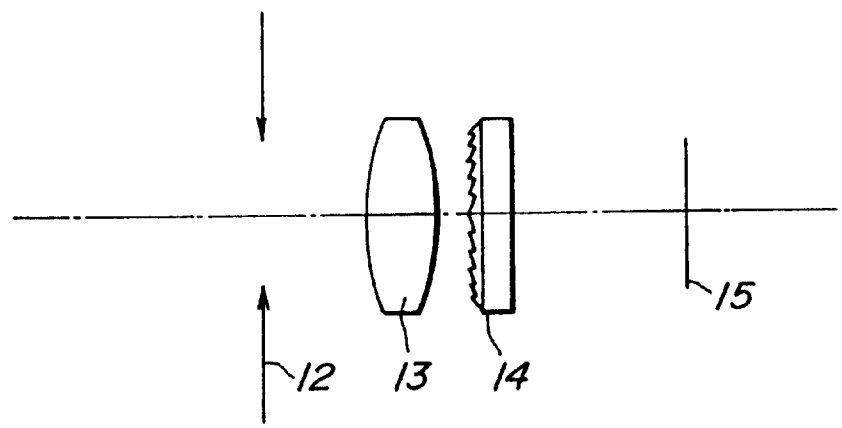
FIG. 24 is a schematic view depicting an embodiment of the optical system according to the invention.

FIG. 24 is a schematic view showing an embodiment of the optical system comprising the diffraction type lens according to the invention. The optical system of the present embodiment may be used as an imaging optical system for use in a camera. The imaging optical system of the present embodiment comprises stop 12, refractive lens 13, relief type diffractive lens 14 and image plane 15. The relief type diffractive lens 14 has the relief pattern formed in a surface opposing to the stop 12. The relief type diffractive lens 14 may be any one of the above mentioned embodiments of the relief type diffractive lens according to the invention.

In the optical system shown in FIG. 24, when an amount of light emanating from an object not shown is increased and a diameter of the stop 12 is decreased, the number of zones through which an incident light flux passes is reduced. In this case, if the relief type diffractive lens is formed by the known diffraction type-lens shown in FIG. 3, an intensity of light converged at the focal point might be reduced to a great extent. However, according to the invention, even if the number of zones of the relief type diffractive lens 14 through which the incident light flux is reduced, an intensity of light converged at the image plane 15 is still sufficiently large. In this manner, undesired degradation in resolution of an image formed on the image plane 15 can be effectively avoided.

In the embodiment of the imaging optical system shown in FIG. 24, the optical system is formed by the refractive lens 13 and the relief type diffractive lens 14, but according to the invention, the refractive lens 13 may be dispensed with. Further, the stop 12 may be dispensed with. In case of removing the stop 12, the relief type diffractive lens 14 is preferably formed to have the number of zones not larger than about 30 in view of the manufacturing and optical performance. It should be further noted that the optical system including the relief type diffractive lens 14 may be constructed as of the reflection type instead of the transmission type.

Figure 25:
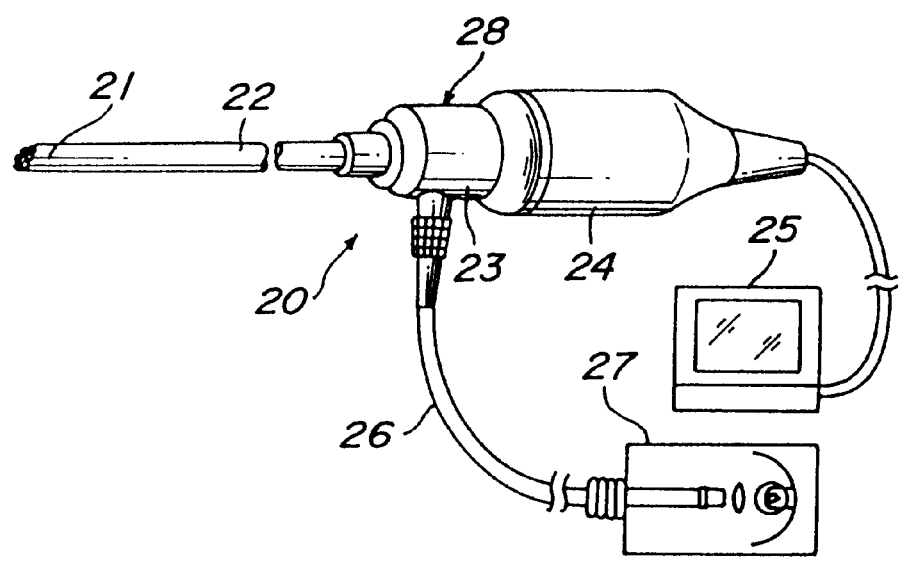
FIG. 25 is a perspective view showing an endoscope comprising the optical system according to the invention.

FIG. 25 is a perspective view showing a whole construction of an endoscope apparatus comprising a direct view type hard endoscope having a rigid insertion section. The endoscope apparatus 20 comprises an endoscope 28 including a hard insertion section 22, a camera 24, a monitor 25, a light guide cable 26 and a light source device 27. Within a distal end of the insertion section 22, there are accommodated an imaging optical system, an illumination optical system, a relay lens system and so on. Within a base portion 23 of the endoscope 28, an eye piece system not shown is arranged and the camera 24 is arranged behind the eye piece optical system. The base portion 23 of the endoscope 28 and the camera 24 are arranged fixed together to form a single unit or detachably from each other. An image picked-up by the camera 24 is displayed on a display device of the monitor 25.

Figure 26:
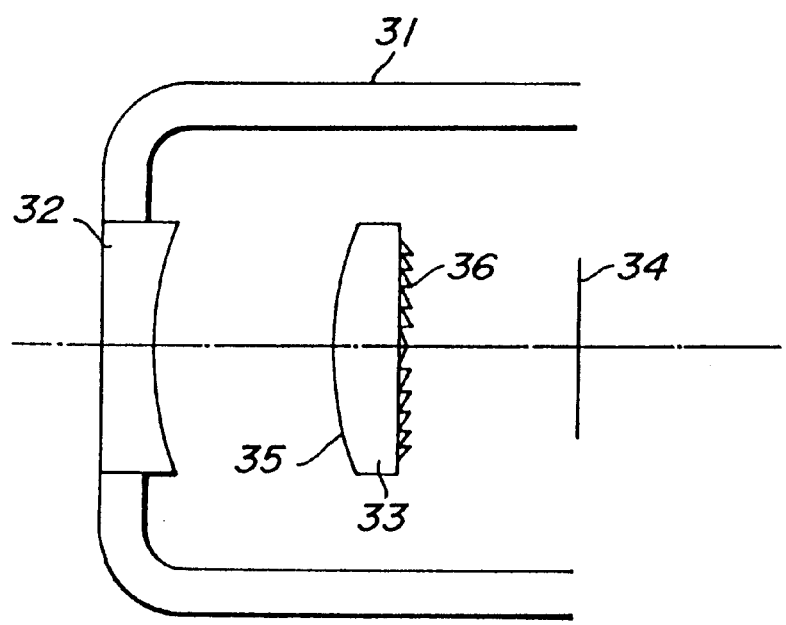
FIG. 26 is a schematic cross sectional view showing a distal end of an insertion section of the endoscope shown in FIG. 25.

In the present embodiment, the imaging optical system arranged in the distal end 21 of the insertion section 22 of the endoscope 28 is formed by the relief type diffractive lens according to the invention. That is to say, as illustrated in FIG. 26, a front concave lens 32 is arranged in a distal end of an outer sheath 31 of the insertion section 22 and a light flux impinging through the front concave lens 32 is focussed on to an image plane 34 by means of a relief type diffractive lens 33 according to the invention. In the present embodiment, the relief type diffraction grating type lens 33 has an aspherical major surface 35 facing to the front concave lens 32 and a non-even width grating pattern 36 formed in a surface opposing to the image plane 34. The non-even width grating pattern 36 may be any of the grating pattern according to the invention. That is to say, a central zone of the non-even width grating pattern 36 may be formed to have a curvilinear cross sectional configuration following the phase shift function and the remaining zones may be formed to have a rectilinear cross sectional configuration which approximates the phase shift function. Alternatively, a central zone of the non-even width grating pattern 36 may be formed to have a cross sectional configuration composed of two or more than two rectilinear portions which approximate the phase shift function and the remaining zones may be formed to have a rectilinear cross sectional configuration which approximates the phase shift function. It should be noted that the illumination optical system and relay optical system may be constructed by known optical systems, and thus they are not shown in the drawings.

The distal end of the outer sheath 31 of the insertion section 22 may have a diameter of several millimeters. In this case, a diameter of the relief type diffractive lens 33 has to be small, and therefore the number of zones of the lens is liable to be smaller than several tens. However, when the relief type diffractive lens 33 is formed by the relief type diffractive lens according to the invention, even if the number of zones is small, undesired decrease in an intensity of light converged on the image plane 34 can be effectively avoided. Therefore, it is possible to monitor an endoscopic image having a high quality.

The present invention is not limited to the embodiments explained above, but many alternations and modifications may be conceived by those skilled in the art within the scope of the invention. For instance, the relief type diffraction optical element according to the invention may be utilized in an optical system other than the imaging optical system. Furthermore, in the above embodiments of the relief type diffraction optical element, the non-even width grating pattern is formed only in one major surface of a substrate. But according to the invention, the non-even width grating pattern may be formed in both major surfaces of the substrate.

In the endoscope apparatus shown in FIGS. 25 and 26, the non-even width grating pattern is formed on the flat surface of the substrate, but it may be formed on the aspherical surface or spherical surface or other curved surface. Further, the endoscope apparatus may be formed as a soft endoscope having a flexible insertion section or a side view type hard or soft endoscope.

As explained above in detail, in the relief type diffraction optical element according to the invention, at least one zone having the maximum width or pitch and belonging to the first zone group is formed to have a ideal curvilinear cross sectional configuration following the phase shift function or a cross sectional configuration composed of at least two rectilinear portions approximating the phase shift function and the remaining zones belonging to the second zone group are formed to have a rectilinear cross sectional configuration approximating the phase shift function. Therefore, an intensity of light converged at a focal point can be increased as compared with the known relief type diffraction optical element in which all zones are formed to have a single rectilinear cross sectional configuration. Moreover, the relief type diffraction optical element according to the invention can be manufactured much more easily than the known relief type diffraction optical element, in which all the zones are formed to have the ideal curvilinear cross sectional configuration. Furthermore, even if the number of zones through which a light flux is transmitted is decreased, undesired reduction in an intensity of light converged at the focal point can be effectively mitigated.

In the optical system according to the invention, since the relief type diffractive lens according to the invention is used, an intensity of light converged at a focal point can be increased. Therefore, the optical system can be small in size without decreasing an intensity of light. Further, when a diameter of a stop arranged in the optical system is reduced and a diameter of a light flux impinging upon the relief type diffractive lens is also reduced, a sufficiently high intensity of light converged at a focal point can be still attained.

Moreover, the mold for manufacturing the relief type diffraction optical element according to the invention can be manufactured easily. Furthermore, a relief type diffraction optical element manufactured by the mold according to the invention can have a better surface roughness. Therefore, undesired scattering of light can be effectively suppressed, the utilization of light can be improved, the degradation of optical performance can be minimized and an intensity of light converged at a focal point can be increased.

What is claimed is:

1. A relief type diffraction optical element having a non-even width grating pattern formed in one of two major surfaces of a substrate, wherein said grating pattern comprises:
    a first zone group including at least a first zone, said first zone having an optical axis of the optical element passing therethrough and a cross sectional configuration which, at a cross section cut along the optical axis, when viewed in one direction from the optical axis toward a periphery of said substrate in a direction normal to the optical axis, comprises a plurality of portions located on one side of the optical axis when viewed in said one direction, each having different inclination angles with respect to a plane perpendicular to the optical axis of the optical element, said first zone group containing a maximum width or pitch zone, said plurality of portions being continuous with one another and none of said plurality of portions is parallel to the optical axis; and
    a second zone group which is disposed at a periphery of said first zone group and includes a plurality of zones, each of said plurality of zones having a cross sectional configuration which, at said cross section cut along the optical axis, when viewed in said one direction from the optical axis toward said periphery of said substrate in said direction normal to the optical axis, has an inclination angle, having a constant absolute value, with respect to said plane perpendicular to the optical axis of the optical element.

2. A relief type diffraction optical element according to claim 1, wherein a zone in said first zone group has a cross sectional configuration including at least two rectilinear portions which approximate a curvilinear cross sectional configuration which follows a phase shift function, and a zone in said second zone group has a cross sectional configuration including only one rectilinear portion which approximates said curvilinear configuration following the phase shift function.

3. A relief type diffraction optical element according to claim 2, wherein said first zone group consisting of only a central zone, said central zone has a cross sectional configuration formed by two rectilinear portions which cross at a cross point on coordinates (R, z) of the phase shift function, said cross point is in a range of ($0 \leq R \leq R_f$, $-2\pi \leq z \leq 0$) and satisfies the following condition:

$z > -2\pi R/R_f$, $z < -3\pi \circledR - 3R_1/5)/R_1$, where $R_f$ is an outer radius of the central zone.

4. A relief type diffraction optical element according to claim 1, wherein said optical element is formed as a diffraction type lens, and a number of zones in said first zone group is not larger than a half of a total number of zones.

5. A relief type diffraction optical element according to claim 1, wherein said relief pattern is constructed by superimposing a surface having a diffraction faculty on a surface having a refraction faculty.

6. A relief type diffraction optical element according to claim 1, wherein all zones in said first and second zone groups are formed to have a common rotation symmetric axis.

7. An optical system including a relief type diffraction optical element as claimed in claim 1.

8. An optical system according to claim 7, wherein said optical system further comprises an aperture stop having a variable aperture area.

9. An optical apparatus comprising a relief type diffraction optical element as claimed in claim 1.

10. An imaging optical system for an endoscope comprising a relief type diffraction optical element as claimed in claim 1.

11. A relief type diffraction optical element having a non-even width grating pattern formed in one of two major surfaces of a substrate, wherein said optical element comprises:
    a first pitch zone group comprising at least a first pitch zone having an optical axis of the optical element passing therethrough; and
    a second pitch zone group which is disposed at a periphery of said first pitch zone group and includes a plurality of pitch zones, each of said plurality of pitch zones having a cross sectional configuration which, at a cross section cut along the optical axis, when viewed in one direction from the optical axis toward a periphery of said substrate in a direction normal to the optical axis, has a constant absolute value inclination angle with respect to a plane perpendicular to the optical axis of the optical element;
    wherein a maximum width or pitch zone among all pitch zones of the optical element has a cross sectional configuration which, at said cross section cut along the optical axis, when viewed in said one direction from the optical axis toward said periphery of said substrate in said direction normal to the optical axis, comprises a plurality of portions located on one side of the optical axis when viewed in said one direction, each of said plurality of portions having different inclination angles with respect to said plane perpendicular to the optical axis of the optical element, said plurality of portions being continuous with one another and none of said plurality of portions is parallel to the optical axis.

12. A relief type diffraction optical element having a non-even width grating pattern formed in one of two major surfaces of a substrate, a cross sectional configuration of said grating pattern which, at a cross section cut along an optical axis, when viewed in one direction from the optical axis toward a periphery of said substrate in a direction normal to the optical axis, comprises a plurality of grooves each of which is defined by at least one line which is not parallel to the optical axis and a line which is substantially parallel to the optical axis; wherein
    a groove through which the optical axis passes is defined by at least two rectilinear lines having different inclination angles and a line which is substantially parallel to the optical axis; and
    each of all remaining grooves is defined by two lines, one of said two lines is a rectilinear line, which is not parallel to the optical axis, and the other is a line which is substantially parallel to the optical axis.

13. A relief type diffraction optical element according to claim 12, wherein said at least two rectilinear lines having different inclination angles form a similar configuration of a phase shift function.

14. A relief type diffraction optical element according to claim 13, wherein said at least two oblique rectilinear lines having different inclination angles intersect at at least one cross point on coordinates (R, z) of the phase shift function, said cross point is in a range of ($0 \leq R \leq R_I$, $-2\pi \leq z \leq 0$) and satisfies the following condition:

$$z > -2\pi R/R_I, \ z < -3\pi \circledR - 3R_I/5)/R_I,$$

wherein $R_I$ is a pitch of said groove through which the optical axis passes.

15. A relief type diffraction optical element according to claim 13, wherein said at least two rectilinear lines having different inclination angles intersect at at least one cross point on coordinates (R, z) of the phase shift function, said cross point is in a range of $0 \leq R \leq 0.59 R_I$, $z=0$, wherein $R_I$ is a pitch of said groove through which the optical axis passes.

16. A relief type diffraction optical element according to claim 12, wherein said optical element is formed as a diffraction type lens.

17. A relief type diffraction optical element according to claim 12, wherein said relief pattern is constructed by superimposing a surface having a diffraction faculty on a surface having refraction faculty.

18. A relief type diffraction optical element according to claim 12, wherein all the grooves are formed to have a common rotation symmetric axis.

19. An optical system including a relief type diffraction optical element as claimed in claim 12.

20. An optical system according to claim 19, wherein said optical system further comprises an aperture stop having a variable aperture area.

21. A relief type diffraction optical element having a non-even width grating pattern formed in one of two major surfaces of a substrate, a cross sectional configuration of said grating pattern which, at a cross section cut along an optical axis, when viewed in one direction from the optical axis toward a periphery of said substrate in a direction normal to the optical axis, comprises a plurality of grooves each of which is defined by at least one line which is not parallel to the optical axis and a line which is substantially parallel to the optical axis, wherein:

a groove having a maximum pitch is defined by at least two rectilinear lines having different inclination angles and a line which is substantially parallel to the optical axis; and each of all remaining grooves is defined by two lines, one of said two lines is a rectilinear line, which is not parallel to the optical axis, and the other is a line which is substantially parallel to the optical axis.

* * * * *